United States Patent [19]

Fresia

[11] Patent Number: 4,781,802

[45] Date of Patent: Nov. 1, 1988

[54] SOLID TANTALUM CAPACITOR PROCESS

[75] Inventor: E. James Fresia, Williamstown, Mass.

[73] Assignee: Sprague Electric Company, North Adams, Mass.

[21] Appl. No.: 42,765

[22] Filed: Apr. 27, 1987

[51] Int. Cl.$^4$ .................. C25D 5/50; C25D 11/02
[52] U.S. Cl. .................. 204/37.1; 204/38.3; 204/42
[58] Field of Search .......... 204/37.1, 37.6, 38.3, 204/42; 29/570

[56] References Cited

U.S. PATENT DOCUMENTS

| | | | |
|---|---|---|---|
| 3,653,119 | 4/1972 | Fresia et al. | 29/585 |
| 3,801,479 | 4/1974 | Nishino et al. | 204/37 |
| 4,052,273 | 10/1977 | Aronson et al. | 204/37 |

FOREIGN PATENT DOCUMENTS 1082390 9/1967 United Kingdom.

OTHER PUBLICATIONS

"Heat-Treatment of Anodic Oxide Films on Tantalum I. The Effects on Dielectric Properties"—D. M. Smyth, G. A. Shirn, T. B. Tripp—J. Electrochem. Soc., vol. 110, No. 12, Dec. 1963, pp. 1264–1271.

*Primary Examiner*—John F. Niebling
*Assistant Examiner*—William T. Leader

[57] ABSTRACT

Anodization of a tantalum pellet in a phosphate/glycol electrolyte is interrupted in order to heat the pellet without bias to a high temperature, then the anodization is completed, then a semiconductor is deposited in the pellet, and then the pellet is heated under bias less than employed during the anodization.

4 Claims, No Drawings

SOLID TANTALUM CAPACITOR PROCESS

BACKGROUND OF THE INVENTION

This invention relates to a process for improving the dielectric properties of solid tantalum capacitors; and more particularly to improving the storage life of hermetically-sealed solid electrolyte tantalum capacitors which are stored at elevated temperatures without any applied voltage.

It is well known in the prior art that a solid electrolyte tantalum capacitor may be manufactured by the following method. A sintered porous tantalum body is anodized in any of a variety of electrolytes so as to form a film of tantalum pentoxide (the dielectric) over all exposed surfaces of the pellet. Several coatings, typically eight to ten, of a manganous nitrate solution are applied over the dielectric, including regions in the pores of the tantalum body. Each coating is fired at a temperature in the range of 250° C. to 400° C. so as to convert the manganous nitrate to the semiconducting coating of manganese dioxide ($MnO_2$). The composite coating of the $MnO_2$ is then coated with a layer of graphite from an aqueous suspension, and a layer of silver from a paint suspension. The unit at this stage is encapsulated by any of several methods, typically by being hermetically sealed in a metal can or by encapsulation in a plastic coating.

Hermetically sealed solid electrolyte tantalum capacitors can undergo some degree of dielectric degradation when stored at elevated temperatures in the absence of an applied bias. This degradation is manifested after the storage period by a high leakage current upon the application of voltage. The leakage current is found to increase with time as the capacitors are maintained at elevated temperatures. Typically a capacitor with a leakage current of less than 0.1 microampere before storage may show a leakage of 1 to 10 microamperes after several days of storage at 125° C. The problem is primarily associated with capacitors rated at the higher voltages, i.e. at 35V and higher.

It is postulated that the increase in leakage current is due to faults occurring in the oxide caused by stress imposed by elevated temperatures. One possible picture is that the oxide cracks, with slight shearing taking place, exposing unanodized tantalum which contacts $MnO_2$ resulting in a high leakage current site.

Though this degradation of the dielectric oxide can occur, it is possible to treat the oxide by thermal and electrochemical techniques such that the stability at elevated temperature storage is dramatically improved. It has been shown by Smyth, Shirn and Tripp in J. Electrochem. Soc., Vol. 110, p. 1264, 1963, that exposure of anodized tantalum to high temperature, greater than 200° C., modifies the dielectric oxide film by causing oxygen to migrate from the oxide into the adjacent tantalum thereby yielding an oxide with increased conductivity due to vacancies in the oxide. During the manufacture of a solid electrolyte tantalum capacitor the tantalum/$Ta_2O_5$ structure is exposed to temperatures in excess of 200° C. repeatedly in order to thermally create the manganese dioxide solid electrolyte.

The deterioration to the oxide increases (1) with increasing pyrolysis temperature used in the manufacturing process and (2) with increasing phosphate and glycol concentration in the anodization electrolyte. The ultimate effect on the capacitor is experienced in increased sensitivity of the capacitance to temperature, frequency and bias.

Methods that have been employed in the prior art to overcome these problems, which deal with the A.C. parameters of the capacitors, have been revealed in GB No. 1,082,390 published Sept. 6, 1967 and in U.S. Pat. No. 3,653,119 issued Apr. 4, 1972.

It has now been observed that the thermal degradation of the dielectric oxide during manufacture of the capacitor also can cause instability of the D.C. leakeage current on elevated temperature storage.

The commonly accepted manufacturing method for solid tantalum capacitors involves anodization or oxide growth in electrolytes composed of phosphate, normally from phosphoric acid, ethylene glycol and water.

The solid electrolyte is deposited by thermal decomposition of manganous nitrate at temperatures greater than 250° C.

The combination of the electrolytes and the elevated temperature of pyrolysis cause deterioration of the oxide film which subsequently results in unstable leakage current on elevated temperature shelf test.

SUMMARY OF THE INVENTION

A feature of this invention is the provision of a dielectric oxide that is not susceptible to damage at elevated temperatures, i.e. an oxide that is not damaged on shelf test.

Another feature of this invention is to provide a process that stabilizes the oxide dielectric such that the leakage current on zero bias and elevated temperature shelf test undergoes minimum or no increase with extended test time.

The process of this invention involves use of the two identified prior art oxide treatment methods previously used individually or alternately to improve the A.C. parameters of the capacitors. Both treatments have been disclosed as methods to improve the A.C. characteristics of the Ta/$Ta_2O_5$ system (D.F., capacitance stability with temperature, frequency and bias), without recognition that the combination of the methods with a suitable electrolyte could solve D.C. leakage current problems.

The initial oxide treatment is used in this invention during the anodization step of the process. During this process step involving the growth of the dielectric oxide, a constant voltage is applied and the pellets are held at voltage from one to five hours depending on the pellet size. It is during this hold period that the initial treatment is introduced. The voltage is interrupted at some point during the hold period and the pellets are exposed to an elevated temperature in the 450° C. to 575° C. range for a period of 5 to 15 minutes. Temperatures below 450° C. do not produce observable improvements, and exposure to above 575° C. imperils the pellets to lose by ignition. A minimum of 5 minutes is required to ensure that a group of pellets achieve the desired temperature, and also tha sufficient oxygen has diffused into the tantalum; no additional advantage is realized for times beyond 15 minutes. After this exposure, the pellets are returned to the anodization bath and the voltage applied and held until the total required oxide formation is achieved.

The second oxide treatment step is introduced after completion of the $MnO_2$ depositions and any conventional reanodization. The pellets are thereafter heated at a temperature ranging from 300° C. to 375° C. under a bias for a period extending from 3 to 15 minutes. Temperatures below 300° C. offer little improvement and exposure to temperatures greater than 385° C. can be harmful since the movement of oxygen at this high temperature out of the oxide exceeds the replacement rate. Periods shorter than 3 minutes are inadequate to achieve the desired effects and greater than 15 minutes offer no further improvement. This treatment is carried out with the tantalum as the anode, and with a bias applied that is sufficient to produce a voltage across the dielectric of up to 15 percent of the original anodization voltage. Voltages in excess of 15% place too high a stress on the oxide, resulting in shorting of the capacitors.

Though this combination offers some improvement in the leakage stability, it has been discovered that these heat treatments coupled with the correct anodization electrolyte yields further stabilization and, in many cases, even a decrease in leakage current occurs.

Since the problem addressed occurs primarily on higher voltage rating capacitors, i.e. 35 V and higher, the typical anodization electrolyte used in the art consists of a solution of phosphoric acid, ethylene glycol and water. As the anodization voltage demands increase it is common for the concentration of phosphoric acid and ethylene glycol to be increased. For example, anodizations in the voltage range of 140 V–160 V (35V capacitors) would be done in a solution of 0.03% phosphoric acid, 15% ethylene glycol and water. For anodizations in the area of 200V a solution of 0.03% $H_3PO_4$, 30% ethylene glycol and water would be used; in the 250 V anodization range a solution of 0.05% $H_3PO_4$, 50% ethylene glycol and water would be used. This series of electrolytes is formulated to maintain the resistivity within the range of 1200 to 1800 ohm-cm, a desirable range for growing a high voltage dielectric. The phosphoric acid concentration is varied primarily for achieving the resistivity; the glycol variation is important in providing the oxide quality at high voltages, because the effect of electrolyte concentration inside the pellets is reduced by the viscosity difference.

Although the higher concentrations of $H_3PO_4$-glycol allow higher anodization voltages to be achieved, they also result in a tantalum oxide film that is more susceptible to undesirable changes when exposed to the high temperatures of pyrolysis that are used during $MnO_2$ deposition. The resulting oxide is then more sensitive to frequency, bias and temperature, which yields capacitors with higher than desired dissipation factors.

As a result of the foregoing sensitivity, the practice heretofore has been to use solutions of the lower concentrations whenever possible.

This invention has recognized that for the maximum stability of leakage current, the two oxide treatment methods should be combined with the higher concentrations of $H_3PO_4$-ethylene glycol, which is contrary to previous knowledge in the capacitor art. Besides stabilizing the shelf test leakage current, the two oxide treatments overcome the problems normally found with use of the more concentrated electrolytes.

DESCRIPTION OF THE PREFERRED EMBODIMENTS

The stability of the leakage current via the above-described processes can be improved by varying degrees depending on the temperature employed in the mid-formation anneal, the concentration of the electrolyte, and the use of the final heat treatment under bias.

The following examples will illustrate the effects of these variables on the improvements that may be expected from the three part combination of this invention.

EXAMPLE I

Porous tantalum pellets were anodized in two different concentrations of electrolytes as given in the table. The combinations of formation annealing and final heat treatment were varied to cover all of the possible combinations. On completion of processing, the capacitors were placed on zero bias 125° C. shelf test for 575 hours. The leakage currents before and after the shelf test are given in the table for each combination. These units were anodized to 165 V and rated at 35 VDC.

TABLE 1

| Electrolyte | Formation Anneal | Final Treatment | Leakage Current - ua Before Test | After 575 Hrs. |
|---|---|---|---|---|
| 0.03% $H_3PO_4$— | No | No | 0.69 | 40. |
| 15% Glycol | No | Yes | 2.1 | 51. |
|  | Yes | Yes | 1.3 | 3.8 |
| 0.05% $H_3PO_4$— | No | No | 0.31 | 36. |
| 50% Glycol | No | Yes | 0.73 | 49. |
|  | Yes | Yes | 1.0 | 0.31 |

These data illustrate the effect of the variation in degree of improvement in the leakage stability that can be achieved. More important are the results obtained when the more concentrated electrolyte is used. In the latter case, a decrease in the leakage current was found. It is also apparent that all three disclosed process steps of this invention are required for optimum benefits.

EXAMPLE II

Porous tantalum pellets were anodized in the 0.05% $H_3PO_4$-50% Glycol electrolyte to a voltage of 270 V. This yields a capacitor rated at 50 VDC. The temperature of the mid-formation annealing step was varied as indicated in Table 2. Upon completion of the capacitors, the usual 125° C. shelf test was given to the parts. The results are given in Table 2.

TABLE 2

| Anneal Temp. | Final Treatment | Leakage Current-ua Before Test | After Test |
|---|---|---|---|
| None | No | 0.053 | 30 |
| 400° C. | Yes | 0.019 | 2.8 |
| 450° C. | Yes | 0.72 | 1.4 |
| 500° C. | Yes | 0.10 | 0.10 |
| 550° C. | Yes | 0.068 | 0.039 |

Again the dramatic effect of the combinations is shown. As the temperature for mid-formation annealing increases, the stability of the leakage current increases.

EXAMPLE III

Porous sintered tantalum pellets were anodized in the 0.05% $H_3PO_4$-50% Glycol electrolyte to a voltage of 160 V. The time at which the voltage was interrupted in order to perform the annealing step was examined. In all cases, the annealing temperature of 550° C. for 10 minutes was used. The final oxide treatment step was also applied to all units. In the table the first column describes the time at voltage before interruption for annealing followed by the post anneal time.

Upon completion of the parts which includes an ageing step, the capacitors were placed on the 125° C. shelf test for 332 hours. The results are given in Table 3.

TABLE 3

| Anneal Location During Anodization | Leakage Current-ua Before Test | After Test |
|---|---|---|
| No anneal | 0.073 | 1.0 |
| 1 hour - Anneal - 3 hours | 0.075 | 0.043 |
| 1 hour - Anneal - 2 hours | 0.067 | 0.049 |
| 3 hours - Anneal - 1 hour | 0.10 | 0.067 |
| 4 hours - Anneal - 1 hour | 0.18 | 0.11 |

From the table it is obvious that the location of the annealing step during anodization is of little or no importance.

The recommended conditions for the three process steps of this invention are as follows:

Annealing:
  Temperature: 450° C. to 575° C.–550° C. preferred
  Time: Five minutes to 15 minutes—10 min. preferred Electrolyte:
  Glycol concentration of 30% to 60%
  $H_3PO_4$ concentration of 0.03% to 0.075%

Oxide Treatment:
  This step is performed after the completion of all $MnO_2$ coatings and reanodization
  Temperature: 325° C. to 375° C.
  Voltage: 3% to 15% of the original anodization voltage
  Time: Three minutes to 30 minutes

What is claimed is:

1. A process for improving the stability of the dielectric oxide in a solid electrolyte tantalum capacitor, said process comprising:
   anodizing a tantalum pellet at a voltage of at least 150V in an electrolyte containing in excess of 0.03% phosphoric acid, 30% to 60% ethylene glycol and water;
   interrupting said anodizing and heating said pellet without bias at a temperature in excess of any temperature in any other step in said process;
   completing said anodizing in said electrolyte;
   pyrolyzing a semiconductor precursor within said pellet; and
   heating said pellet under a bias with said tantalum pellet as the anode, said bias being less than employed in said anodizing.

2. The process of claim 1 wherein said phosphoric acid concentration is 0.05%±0.01%.

3. The process of claim 1 wherein said heating without bias is at 450° C. to 575° C. for 5 minutes to 20 minutes, and said bias is 3% to 15% of the voltage in said anodizing.

4. The process of claim 1 wherein said heating under bias is at 325° C. to 375° C. for 3 minutes to 20 minutes and said bias is 3% to 15% of the voltage in said anodizing.

* * * * *

UNITED STATES PATENT OFFICE
CERTIFICATE OF CORRECTION

Patent No. 4,781,802             Dated November 1, 1988

Inventor(s) E. James Fresia

It is certified that error appears in the above-identified patent and that said Letters Patent are hereby corrected as shown below:

Column 2, line 10, "leakeage" should read -- leakage --
Column 2, line 57, "tha" should read -- that --
Column 6, in the Claims of the patent, Claim 3 should read as follows:
 -- 3. The process of claim 1 wherein said heating without bias is at 450°C to 575°C for 5 minutes to 15 minutes. --

Signed and Sealed this

Seventh Day of March, 1989

*Attest:*

DONALD J. QUIGG

*Attesting Officer*     *Commissioner of Patents and Trademarks*